United States Patent
Lin

(10) Patent No.: US 8,423,599 B2
(45) Date of Patent: Apr. 16, 2013

(54) LOCUS SMOOTHING METHOD

(75) Inventor: Chun-Huang Lin, HsinChu (TW)

(73) Assignee: Chip Goal Electronics Corporation, ROC, Hsin-Chu (TW)

( * ) Notice: Subject to any disclaimer, the term of this patent is extended or adjusted under 35 U.S.C. 154(b) by 490 days.

(21) Appl. No.: 12/859,535

(22) Filed: Aug. 19, 2010

(65) Prior Publication Data

US 2012/0047193 A1    Feb. 23, 2012

(51) Int. Cl.
*G06F 7/38* (2006.01)

(52) U.S. Cl.
USPC ............................................. 708/445

(58) Field of Classification Search ........... 708/445
See application file for complete search history.

(56) References Cited

U.S. PATENT DOCUMENTS 8,189,049 B2 * 5/2012 Lopota et al. ............. 348/152
2009/0296989 A1 * 12/2009 Ramesh et al. ........... 382/103

* cited by examiner

*Primary Examiner* — Tan V. Mai

(74) *Attorney, Agent, or Firm* — Tung & Associates

(57) ABSTRACT

The present invention discloses a locus smoothing method, comprising: generating multiple locus points by movement of an object; obtaining corresponding coordinates of the locus points; calculating a moving average coordinate of the coordinates of the locus points by a moving average function, wherein an average number is used as a denominator; adaptively adjusting the average number according to a velocity of the object, wherein a lower average number is used when the velocity of the object is relatively faster, and a higher average number is used when the velocity of the object is relatively slower.

7 Claims, 5 Drawing Sheets

LOCUS SMOOTHING METHOD

BACKGROUND OF THE INVENTION

1. Field of Invention

The present invention relates to a locus smoothing method, and particularly to a locus smoothing method capable of adaptively adjusting the calculation for locus.

2. Description of Related Art

Conventionally, for smoothing multiple locus points generated by movement of an object, an average function is adopted for calculating a moving average coordinate of each locus point; in the calculation, an average number n is used as a denominator. FIG. 1 shows the relationship between the average number and the smoothness of a corresponding curve, wherein C1, C2, and C3 are curves of moving average coordinates generated by the same movement of an object, but calculated by different average numbers, respectively. The curve C1 is generated by the average number n=2; the curve C2 is generated by the average number n=8; and the curve C3 is generated by the average number n=16. As shown in the drawing, the higher the average number n is, the better the smoothness of the curve is. However, where the average number is higher, the delay time is longer for the calculated locus point to catch up the actual position. FIG. 2 depicts the relationship between the average number n and the time delay. C4 and C5 are curves of the moving average coordinates generated by the same movement of an object by use of different average numbers n, wherein the curve C4 is generated by the average number n=4; The curve C5 is generated by the average number n=16. As shown in the drawing, the higher the average number is, the longer the time is required for the calculated locus point to catch up the actual position.

In view of the foregoing, there are pros and cons in the prior art either using a higher or a lower average number for calculating the coordinates of locus points, but one system can not satisfy both.

SUMMARY OF THE INVENTION

An objective of the present invention is to provide a locus smoothing method.

To achieve the foregoing objective, in one perspective of the present invention, it provides a locus smoothing method for smoothing a locus generated according to movement of an object, comprising: generating multiple locus points according to the movement of the object, and obtaining corresponding coordinates of the locus points; calculating a moving average coordinate of the locus points by a moving average function, wherein the moving average coordinate is calculated by use of an average number as a denominator; adaptively adjusting the average number according to a velocity of the object, wherein a lower average number is used when the velocity of the object is relatively faster, and a higher average number is used when the velocity of the object is relatively slower.

In one preferable embodiment, the moving average coordinate $avg_T$ is generated according to the following function:

$$sum_T = sum_{(T-1)} - avg_{(T-1)} + new, \text{ and}$$

$$avg_T = sum_T / n,$$

wherein "$avg_T$" and "$avg_{(T-1)}$" represent the moving average coordinates generated at current time T and previous time T−1, respectively; "$sum_T$" and "$sum_{(T-1)}$" represent sums of the coordinates of the locus points at current time T and previous time T−1, respectively; "new" represents the coordinate of the locus point at current time T; and "n" represents the average number.

In another preferable embodiment, the step of adaptively adjusting the average number according to the velocity of the object includes: providing at least one velocity threshold; determining whether the velocity of the object is higher than the velocity threshold; and adaptively adjusting the average number according to the result of the determining step.

In yet another preferable embodiment, the step of adaptively adjusting the average number according to the velocity of the object includes: providing at least one set of velocity hysteresis thresholds, the velocity hysteresis thresholds including a high limit and a low limit; when the velocity of the object increases above the high limit, using the lower average number; when the velocity of the object decreases below the low limit, using the higher average number.

In yet another preferable embodiment, the coordinate of the locus point is an absolute coordinate number. In still another preferable embodiment, the coordinate of the locus point is a relative coordinate number and the method further comprises: converting the relative coordinate number to an absolute coordinate number. The object whose movement generates the locus points for example can be a remote controller, a mouse, an object capable of projecting light, or any object whose movement is detectable.

The objectives, technical details, features, and effects of the present invention will be better understood with regard to the detailed description of the embodiments below, with reference to the drawings.

DESCRIPTION OF THE PREFERRED EMBODIMENTS

As mentioned earlier, there are pros and cons in the prior art either using a higher or a lower average number for calculating the coordinates of locus points, but one system can not satisfy both. In view of foregoing, the present invention provides a locus smoothing method for adaptively adjusting the average number n according to the velocity of the object. More specifically, when the velocity of the object is slower, coordinates of locus points generated according to the movement of the object are more likely interfered by noises, such that the locus presents a less smooth or even a saw-tooth curve. On the contrary, when the velocity of the object is faster, the non-smoothness is reduced and less perceivable due to the larger displacement; the impact of noises is much less. For example, if the noise is ±1 unit and the displacement within one unit time is 10 units, the weighting of the noise will be 10%; while if the displacement within one unit time is 2 units, the weighting of the noise will be 50%. On the other hand, when the velocity of the object is faster, the time delay caused by the calculation of moving average coordinate has a larger impact; and when the velocity of the object is slower, the time delay caused by the calculation of moving average coordinate has a smaller impact. Therefore, the present invention detects the present velocity of the object, and adaptively adjusts the average number n according to the velocity of the object. When the velocity of the object is relatively faster, a relatively lower average number is used to calculate the moving average coordinate avg of the locus points for increasing the system efficiency; and when the velocity of the object is relatively slower, a relatively higher average number is used to calculate the moving average coordinate avg of the locus points for filtering noises and increasing the smoothness of the curve of the locus points.

There are various moving average functions, and the moving average coordinate avg can be calculated according to any of such functions according to the choice by a user. For example, one of the functions to calculate the moving average coordinate is:

$$\text{sum}_T = \text{sum}(T-1) - \text{avg}(T-1) + \text{new}; \text{ and}$$

$$\text{avg}_T = \text{sum}/n,$$

wherein "$\text{avg}_T$" and "$\text{avg}_{(T-1)}$" represent the moving average coordinates generated at current time T and previous time T−1, respectively; "$\text{sum}_T$" and "$\text{sum}_{(T-1)}$" represent sums of the coordinates of the locus points at current time T and previous time T−1, respectively; "new" represents the coordinate of the locus point at current time T; and "n" represents the average number.

Figure 3:
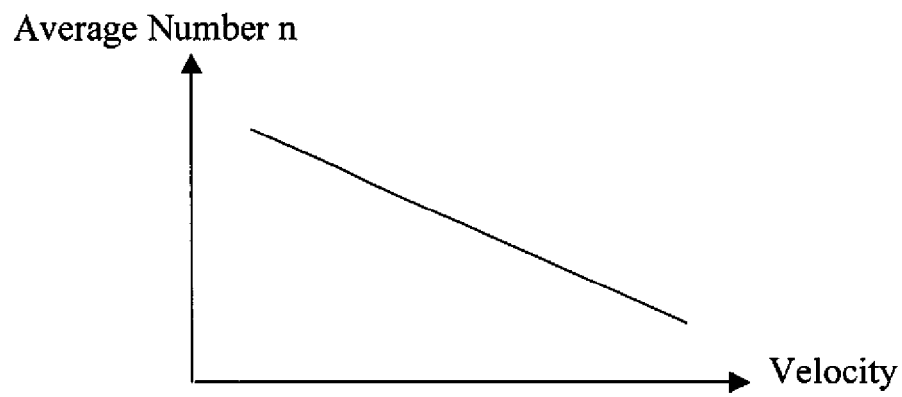
FIGS. 3-5 show several embodiments to determine the average number n in accordance with the velocity of the object.
Figure 4:
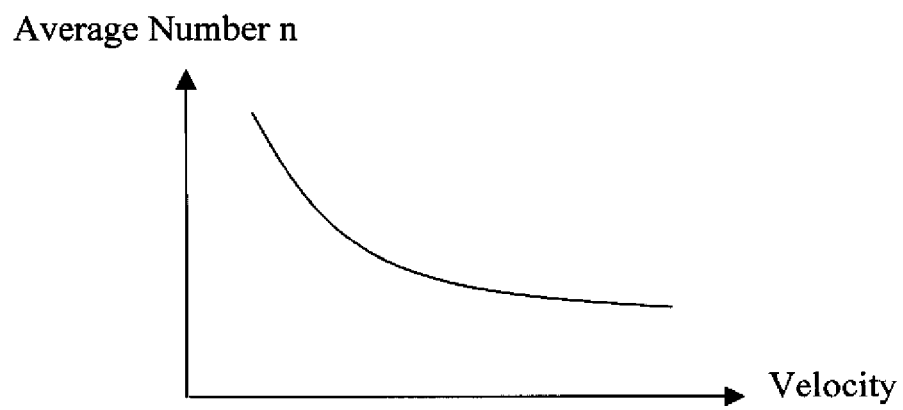
Figure 5:
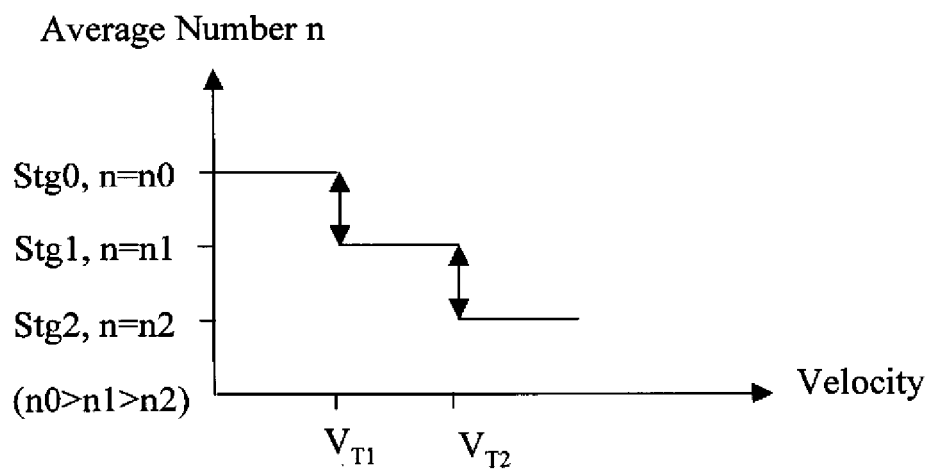

According to the present invention, there are various ways to adjust the average number n according to the velocity of the object. The relationship between the velocity of the object and the average number n for example can be one of the followings: linear adjustment (e.g., n=[−av+b], wherein a and b are constants, and n can be the integer part of the equation, as referring to FIG. 3); inverse adjustment (e.g., n=[a/v+b]), wherein a and b are constants, and n can be the integer part of the equation, as referring to FIG. 4), or stage adjustment (referring to FIG. 5). As one example of the stage adjustment, please refer to FIG. 6 in conjunction with FIG. 5, wherein n0>n1>n2, and VT2>VT1:

In step S100, the system starts operation; next, step S101 is taken.

In the step S101, the moving average coordinate avg is calculated by a predetermined average number n=n0 defined in stage stg0; next, step S102 is taken.

In the step S102, the velocity of the object is detected. If the velocity of the object is not higher than a first threshold value VT1, the average number is maintained at the number of stage stg0, i.e., n=n0, and the flow returns to step S101. When the velocity of the object increases above the first velocity threshold VT1, step S103 is taken.

In the step S103, the moving average coordinate avg is calculated by a predetermined average number n=n1 defined in stage stg1. Next, steps S104 and S107 are taken.

In the steps S104 and S107, the velocity of the object is detected. If the velocity of the object is not lower than the first velocity threshold VT1, or not higher than the second velocity threshold VT2, the average number is maintained at the number of stage stg1, i.e., n=n1, and the flow returns to step S103. When the velocity of the object decreases below the first velocity threshold VT1, the flow returns to step S101; when the velocity of the object increases above the second velocity threshold VT2, step S105 is taken. The steps S104 and S107 can be performed in parallel or in any order.

In the step S105, the moving average coordinate avg is calculated by a predetermined average number n=n2 defined in the stage stg2; next, step S106 is taken.

In the step S106, the velocity of the object is detected. If the velocity of the object keeps higher than the second velocity threshold VT2, the average number is maintained as n=n2, and the flow returns to step S105. When the velocity of the object decreases below the second velocity threshold VT2, the flow returns to step S103.

The foregoing stage adjustment has an advantage that the average number n is not changed simply by small variation of the velocity; this helps to maintain the system stability and to reduce the complexity of the circuitry. In addition to the above, there are many other ways to design the stage adjustment of the average number n. Those skilled in this art can readily conceive variations and modifications under the teachings by the present invention; these variations and modifications shall fall within the scope of the present invention. For example, a hysteresis zone can be provided in each stage transition. As one example, please refer to FIG. 7 in conjunction with FIG. 8, wherein n0>n1>n2, and VT2_H>VT2_L>VT1_H>VT1_L:

In step S200, the system starts operation; next, step S201 is taken.

In the step S201, the moving average coordinate avg is calculated by a predetermined average number n=n0 defined in stage stg0; next, step S202 is taken.

In the step S202, the velocity of the object is detected. If the velocity of the object is not higher than a first high velocity hysteresis threshold VT1_H, the average number is maintained at the number of stage stg0, i.e., n=n0, and the flow returns to step S201. When the velocity of the object increases above the first high velocity hysteresis threshold VT1_H, step S203 is taken.

In the step S203, the moving average coordinate avg is calculated by a predetermined average number n=n1 defined in stage stg1. Next, steps S204 and S207 are taken.

In the steps S204 and S207, the velocity of the object is detected. If the velocity of the object is not lower than the first low velocity hysteresis threshold VT1_L, or not higher than the second high velocity hysteresis threshold VT2_H, the average number is maintained at the number of stage stg1, i.e., n=n1, and the flow returns to step S203. When the velocity of the object decreases below the first low velocity hysteresis threshold VT1_L, the flow returns to step S201; when the velocity of the object increases above the second high velocity hysteresis threshold VT2_H, step S205 is taken. The steps S204 and S207 can be performed in parallel or in any order.

In the step S205, the moving average coordinate avg is calculated by a predetermined average number n=n2 defined in the stage stg2; next, step S206 is taken.

In the step S206, the velocity of the object is detected. If the velocity of the object keeps higher than the second low velocity hysteresis threshold VT2_L, the average number is maintained at the number of stage stg2, i.e., n=n2, and the flow returns to step S205. When the velocity of the object decreases below the second low hysteresis velocity threshold VT2_L, the flow returns to step S203.

Figure 6:
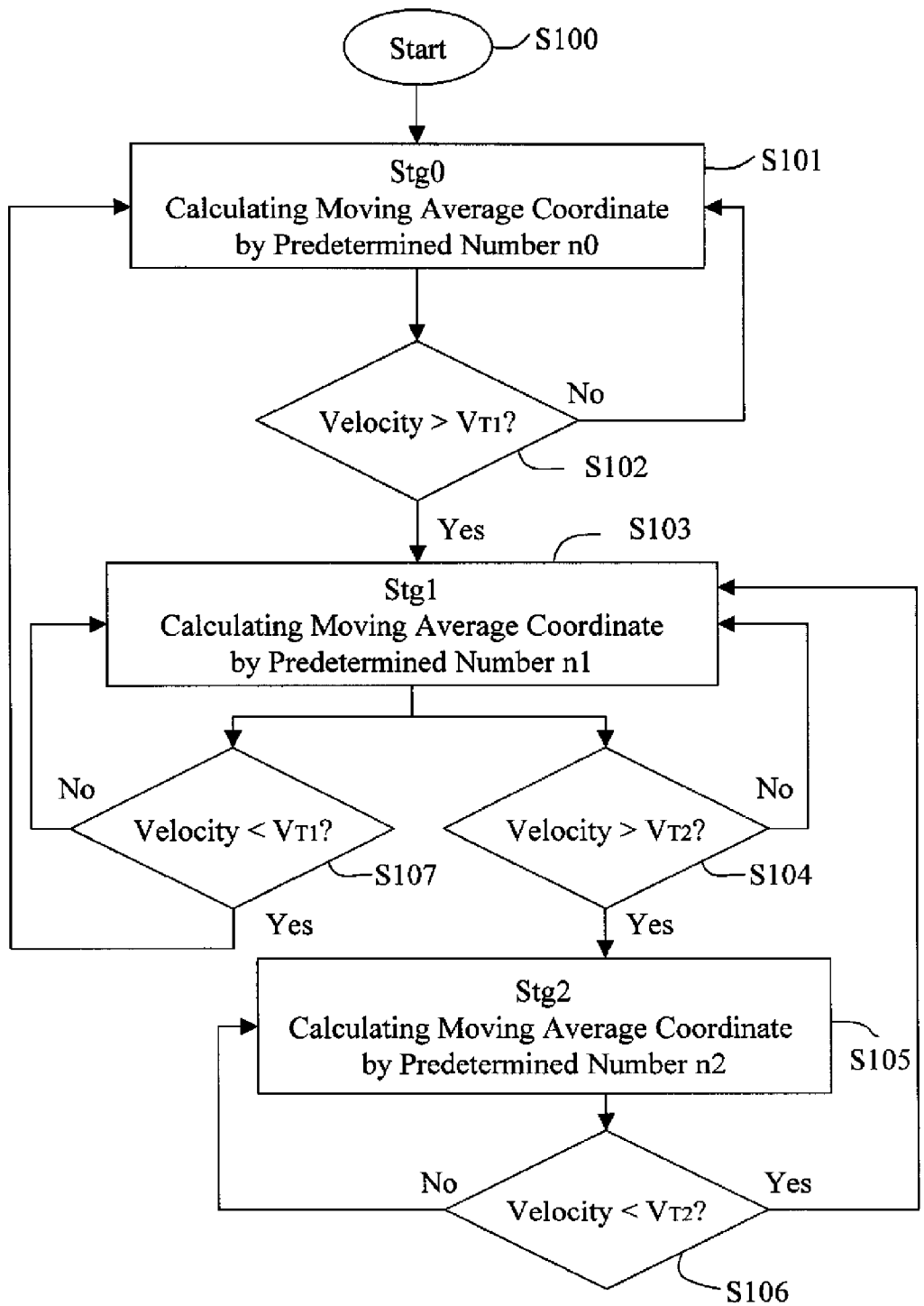
FIG. 6 shows a flow chart for adjusting the average number n by stages according to the velocity of the object.
Figure 7:
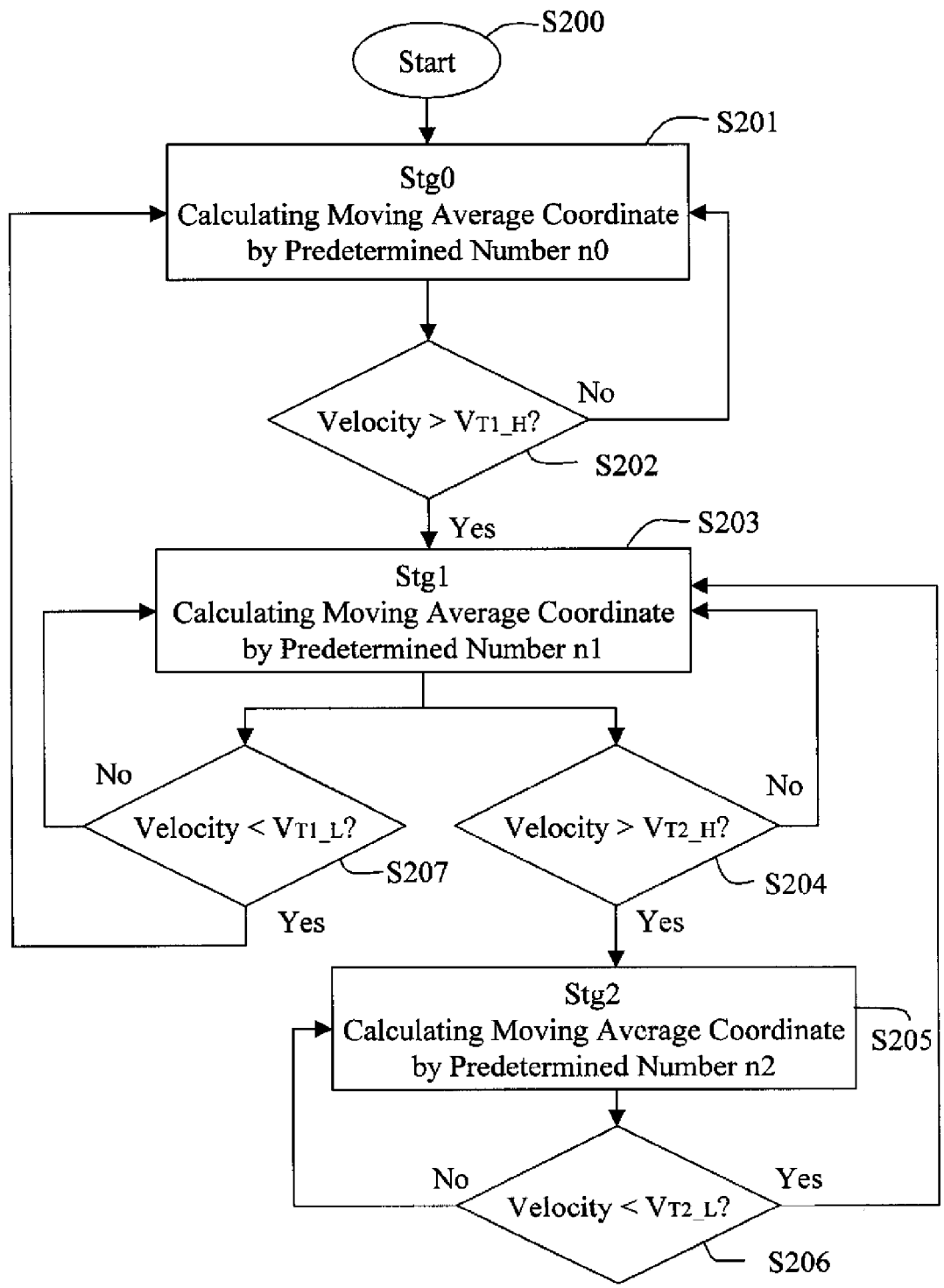
FIG. 7 shows a flow chart for adjusting the average number n by stages, wherein the determination for stage change is provided with hysteresis zones.
Figure 8:
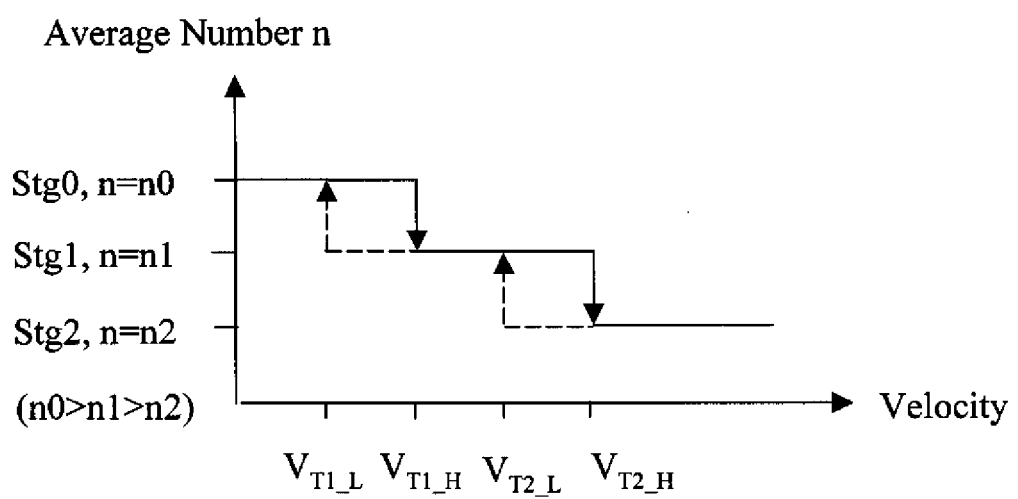
FIG. 8 shows a relationship between the velocity of the object and the average number n when the determination for stage change is provided with hysteresis zones.

In the foregoing flowcharts depicted in FIGS. 6 and 7, it is not required for the system to start from the stage stg0; it can start from any stage of stg0, stg1, and stg2. The initial value of the average number n is not required to be n0 (the maximum number corresponding to the lowest velocity); instead, it can certainly start from any number such as the minimum predetermined value n=n2 (corresponding to the highest velocity) or any middle number (e.g., n=n1). Namely, the system can start from any step of S101-S107 or any step of S201-S207 in FIG. 6 or 7 after start.

In the foregoing embodiments, the coordinate generated according to the locus point can be an absolute coordinate number or a relative coordinate number. To facilitate system operation, when the coordinate of the locus point is the relative coordinate number, the relative coordinate number is preferably converted to the absolute coordinate number before the moving average coordinate is calculated. The object can be moved under the absolute coordinate system or the relative coordinate system. The object for example can be a remote controller, a mouse, an object capable of projecting light, or any object whose movement is detectable.

Figure 1:
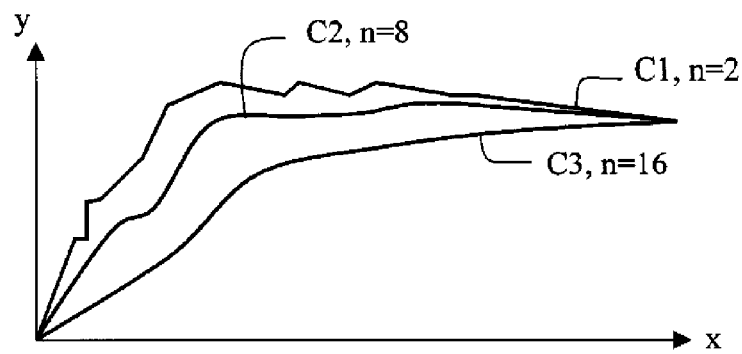
FIG. 1 shows the relationship between the average number and the smoothness of a corresponding curve, wherein multiple curves are shown for comparison.
Figure 2:
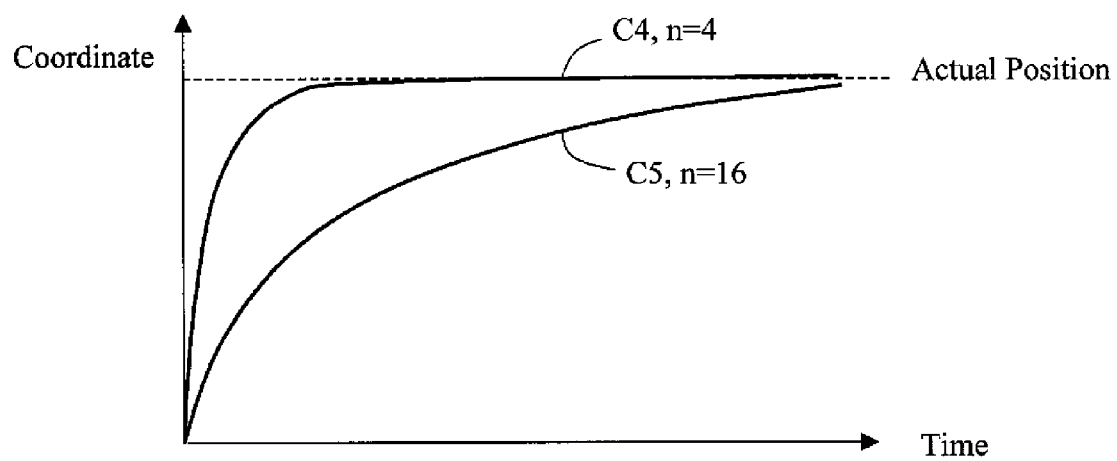
FIG. 2 shows the relationship between the average number n and the time delay for the calculated locus point to catch up the actual position.

Note that the calculation of the moving average coordinate according to the present invention can be applied to a coordinate system of any dimension. Although FIG. 1 shows an x-y two-dimensional coordinate system, the present invention is not limited to such two-dimensional coordinate system, but can be applied to one- or multiple-dimensional coordinate system as well. If the dimension number is two or more than two, the coordinate in each dimension can be calculated in parallel, in a time-sharing sequential order, or by a combination of both, which can be designed and chosen according to cost-efficiency evaluation.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A locus smoothing method for smoothing a locus generated according to movement of an object, comprising:
   generating multiple locus points according to the movement of the object, and obtaining corresponding coordinates of the locus points;
   calculating a moving average coordinate of the locus points by a moving average function, wherein the moving average coordinate is calculated by use of an average number as a denominator;
   adaptively adjusting the average number according to a velocity of the object,
   wherein a lower average number is used when the velocity of the object is relatively faster, and a higher average number is used when the velocity of the object is relatively slower.

2. The method of claim 1, wherein the moving average coordinate $avg_T$ is generated according to the following function:

$$sum_T = sum_{(T-1)} - avg_{(T-1)} + new, \text{ and}$$

$$avg_T = sum_T / n,$$

wherein "$avg_T$" and "$avg_{(T-1)}$" represent the moving average coordinates generated at current time T and previous time T−1, respectively; "$sum_T$" and "$sum_{(T-1)}$" represent sums of the coordinates of the locus points at current time T and previous time T−1, respectively; "new" represents the coordinate of the locus point at current time T; and "n" represents the average number.

3. The method of claim 1, wherein the step of adaptively adjusting the average number according to the velocity of the object includes:
   providing at least one velocity threshold;
   determining whether the velocity of the object is higher than the velocity threshold; and
   adaptively adjusting the average number according to the result of the determining step.

4. The method of claim 1, wherein the step of adaptively adjusting the average number according to the velocity of the object includes:
   providing at least one set of velocity hysteresis thresholds, the velocity hysteresis thresholds including a high limit and a low limit;
   when the velocity of the object increases above the high limit, using the lower average number;
   when the velocity of the object decreases below the low limit, using the higher average number.

5. The method of claim 1, wherein the coordinate of the locus point is an absolute coordinate number.

6. The method of claim 1, wherein the coordinate of the locus point is a relative coordinate number and the method further comprises: converting the relative coordinate number to an absolute coordinate number.

7. The method of claim 1, wherein the object is a remote controller, a mouse, an object capable of projecting light, or an object whose movement is detectable.

* * * * *